United States Patent

[11] 3,599,657

| [72] | Inventor | Ojars Maldavs<br>Lincoln, Nebr. |
|---|---|---|
| [21] | Appl. No. | 822,811 |
| [22] | Filed | Apr. 7, 1969 |
| [45] | Patented | Aug. 17, 1971 |
| [73] | Assignee | Bruning Company<br>Lincoln, Nebr. |

[54] DOUBLE DIAPHRAM CHECK VALVE
5 Claims, 5 Drawing Figs.

[52] U.S. Cl. ................................... 137/102,
137/512, 261/DIG. 7, 137/525, 137/512.4
[51] Int. Cl. ................................................. G05d 7/00
[50] Field of Search............................. 261/DIG. 7;
137/63 R, 87, 102, 107, 217, 218, 512.4, 525, 512

[56] References Cited
UNITED STATES PATENTS

| 2,497,906 | 2/1950 | Peters et al. | 137/525 X |
|---|---|---|---|
| 2,758,609 | 8/1956 | Dickert et al. | 137/525 |
| 2,953,153 | 9/1960 | Gaul | 137/218 |
| 3,011,512 | 12/1961 | Moen | 137/102 |
| 3,065,761 | 11/1962 | Peras | 137/107 X |
| 3,084,707 | 4/1963 | Frye | 137/102 |
| 3,476,142 | 11/1969 | Schultz | 137/525 |
| Re. 26,235 | 7/1967 | Woodford | 137/525 |

FOREIGN PATENTS

| 372,932 | 12/1963 | Switzerland | 137/218 |
|---|---|---|---|

Primary Examiner—Laverne D. Geiger
Assistant Examiner—David J. Zobkiw
Attorneys—Keith Misegades and George R. Douglas, Jr.

ABSTRACT: A double elastic diaphragm check valve for dealing with a liquid on the upstream side and liquid and gas on the downstream side is provided. None of the metallic parts move, avoiding frictional wear nor are there metal parts subject to stress corrosion. The structure is free of internal threads and other crevices susceptible of retaining dirt or other foreign matter. In normal operating sequence and even simple abnormalities the valve vents only gas avoiding liquid spillage.

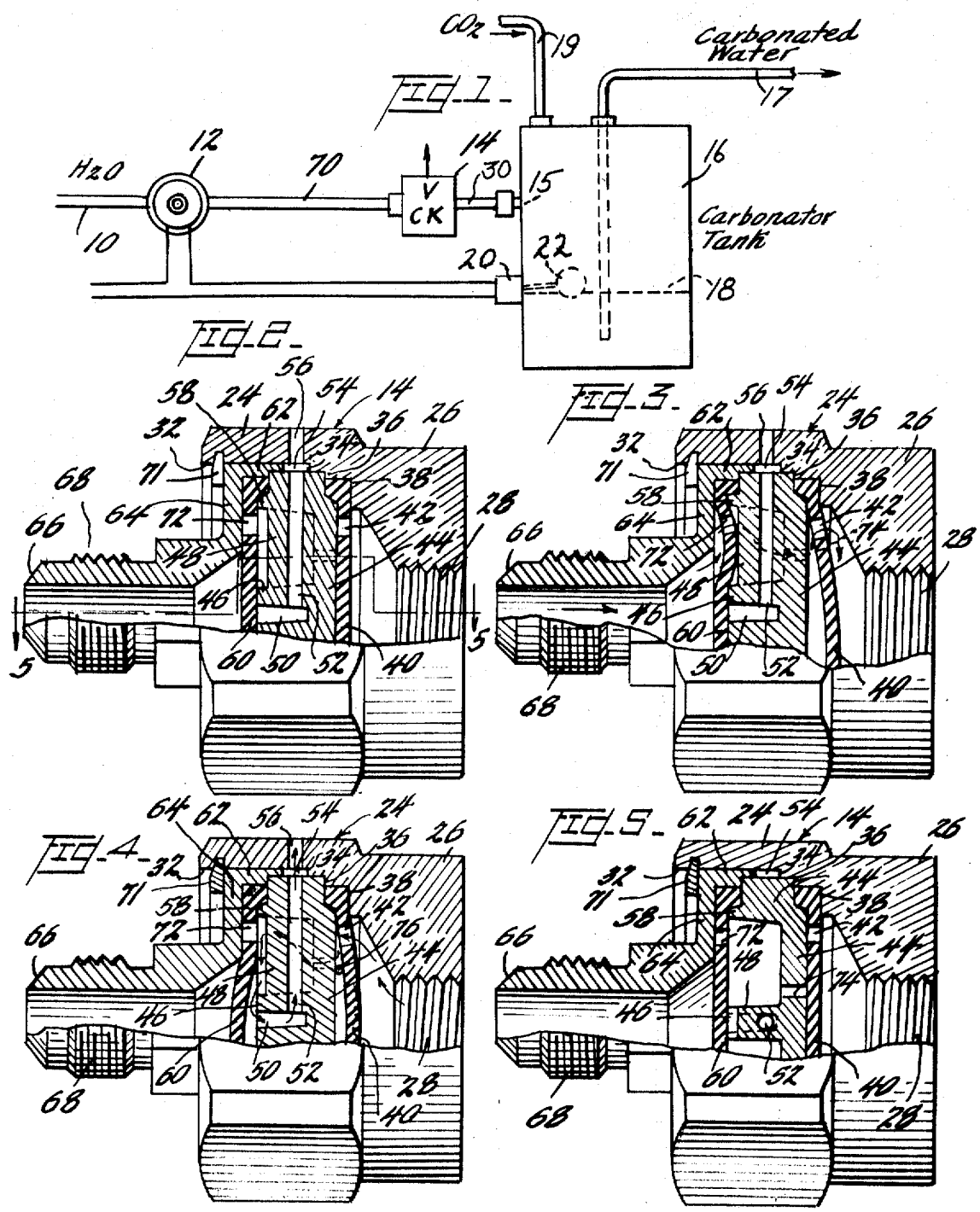

DOUBLE DIAPHRAM CHECK VALVE

This invention relates to valves, and in particular to a check valve used in a mixing operation for water and carbon dioxide, in a beverage vending machine, for instance.

It is a general object of the invention to provide a novel and improved check valve for mixing a pair of liquids, a pair of gases or a liquid and a gas.

More particularly, it is an object of the invention to provide a check valve adapted to prevent carbon dioxide under pressure, in a mixing system, from flowing back into the water supply.

Another object is to provide a vent means for action in the event of failure of a portion of the check means in the valve.

The object also include provision of a valve which is simple in structure, yet durable and dependable in use, and which is also easy of manufacture and assembly, as well as low in cost.

The invention will be explained hereinafter, in terms of the particular objective of mixing carbon dioxide and water, it being understood that other liquids or gases may be substituted; in appropriate cases, different materials of constructions may be substituted to be compatible with the liquid or gas.

These and other objects, which will be apparent, are attained by the present invention, a preferred form of which is described in the following specification, as illustrated in the drawing, in which:

FIG. 1 is a schematic diagram of the mixing layout;

FIG. 2 is a partial, axial, sectional view through the check valve of the invention, in normal, closed position under back pressure of the $CO_2$;

FIG. 3 is a view similar to FIG. 2 showing the pressurized water overcoming the check valve, for normal, mixing flow;

FIG. 4 is a view similar to FIG. 2, showing the valve in checking position, under abnormal conditions leading to partial failure of the check means, and FIG. 5 is a partial, axial, section view through the valve, taken on the staggered line 5-5 of FIG. 2.

Referring to the drawings by reference numerals and characters therein, in FIG. 1 there is shown a water supply pipeline 10, in which is inserted a pump 12, and a check valve 14. Beyond valve 14, the waterline terminates in a spray nozzle 15, extending into carbonator tank 16. Carbonated water is withdrawn through line 17, extending below liquid level 18, in tank 16, while carbon dioxide is admitted to the tank through line 19, above the liquid level. Thus there is communication between the carbon dioxide inlet 19, and the downstream side of valve 14. The liquid level 18, in tank 16 is controlled by a float switch 20, having float 22 within tank 16. As indicated schematically, the float switch 20, controls an electric circuit driving a motor for pump 12.

Referring to FIG. 2, the valve 14 is seen as comprising a main body 24, in the form of a hollow, hexagonal nut, having a reduced, cylindrical end portion 26, with an axial, threaded bore 28, adapted for attachment to a section of pipe 30 in the line 10. For accommodating the other parts of the valve, the cup-shaped nut 24 has a main bore 32, with three, stepwise reduced bores in the mid portion, defining shoulders 34, 36 and 38. Seated on the innermost shoulder 38 is a rubber diaphragm 40, having a series of apertures 42, arranged on a circular line. An insert plug 44, seated on a shoulder 36, makes sealing contact with a peripheral flange on diaphragm 40. On the upstream side, plug 44 has an axial boss 46, connected with a radial rib 48, the boss having an axial bore 50, communicating with a radial bore 52 in rib 48. Through an annular chamber 54, caused by the peripheral spacing of plug 44 from the interior wall of nut 24, the bore 52 vents to atmosphere through a radial bore 56 in the nut.

A circular rib 58, on the upstream face of plug 44, extends outward as far as, or nearly as far as, boss 46, and forms a seat for the peripheral flange or skirt of a second, rubber diaphragm 60, which is held in place by its nested position in the hollow of an internal, peripheral flange or skirt 62, on a fitting 64, having a taper 66, and a threaded portion 68, for retention of a section of flared tubing 70, in the line 10. Fitting 64 is held in place in the nut 24 by means of a split, retaining spring ring 71. Like diaphragm 40, the diaphragm 60 has a circular line of apertures 72, which are closed by contact with the bottom of the inner cup of fitting 64, but which are adapted to communicate with the annular space around boss 46, on the upstream side of plug 44. As seen in FIG. 5, this communication is extended to a bore 74 in plug 44, located apart from the axis thereof, and this communication is continued through apertures 42 in diaphragm 40, to permit downstream flow of water to the mixing point.

In a practical application, the water pressure may be 180 p.s.i., and the opposed, $CO_2$ pressure may be from 70 to 150 p.s.i. When the water pressure is reduced below that of the $CO_2$, the valve parts are as shown in FIG. 2, wherein diaphragm 40 is pressed against the downstream surface of plug 44, thus closing off apertures 42, and effectively preventing movement of $CO_2$ upstream in the water line. In this situation, the other diaphragm 60 is pressed against axial boss 46, thus preventing water movement from the waterline to axial bore 50.

FIG. 3 shows the situation wherein the water pressure exceeds the $CO_2$ pressure. Here the radially intermediate zone of diaphragm 60 is deformed downstream into the hollow within bead or rib 58, and, as shown by the arrows, the water passes through apertures 72 of diaphragm 60, through port 74 of plug 44, through apertures 42 of diaphragm 40, and thus into pipe 30 and on to the junction with the $CO_2$.

FIG. 4 shows the situation wherein the $CO_2$ pressure exceeds the water pressure, and check diaphragm 40 fails, as in the case wherein a particle of foreign matter 76, becomes lodged behind it, the gas pressure will first act upon diaphragm 60, sealing off the gas by pressure against fitting 64, and at the same time causing the center of the diaphragm to bulge in the upstream direction. This uncovers axial bore 50, and the gas is vented to atmosphere through this bore, passage 52 and port 56. This situation obtains in the event of leakage of $CO_2$ past the check valve for any reason.

It is seen that there has thus been provided a valve which while readily permitting water flow to a mixing junction, also provides a check valve which is readily responsive and certain in action, and which "fails safe," by venting in the event of malfunction of the check means.

While a certain, preferred embodiment has been shown and described, various modifications will be apparent in the light of this disclosure, and the invention should not, therefore, be deemed as limited, except insofar as shall appear from the spirit and scope of the appended claims.

I claim:
1. Valve means having upstream and downstream connections comprising:
   A. a cup-shaped body having
      1. its open end upstream and
      2. its exit opening downstream;
   B. a plug spanning the interior of the body
      1. having, on the downstream side, a flat surface;
      2. having, on the upstream side, a recessed annular channel, with a central boss; and
      3. having through passages leading from the annular channel to openings in the flat face;
   C. a rubbery diaphragm on the downstream side peripherally secured between the plug and the body with
      1. through openings arranged about the outer portion thereof radially remote from the openings in the flat face;
   D. an open space within the body between the downstream diaphragm and the exit opening to permit flexing of the diaphragm;
   E. a rubbery diaphragm on the upstream side of the plug, peripherally sealed to the plug with
      1. through openings arranged about an outer zone of the diaphragm and opening into the annular channel of the plug; and

F. a closure for the body having
  1. means for sealing the periphery of the upstream diaphragm to the corresponding portion of the plug; and
  2. a flat face opposite the openings in the upstream diaphragm, in sealing engagement therewith when said diaphragm is unflexed said elements being arranged so that normal downstream flow enters the valve means on the upstream side of the upstream diaphragm forcing said upstream diaphragm into the annular channel of the plug, unseating the through openings of the upstream diaphragm from the flat face of the closure, the stream flow passing through the plug, unseating the downstream diaphragm from the flat face of the plug whereby fluid passes out of the exit opening of the cup; said elements also functioning in the event of reverse pressure from the downstream side to press the two diaphragms against the respective flat faces of the plug and closure to seal the openings of the diaphragms.

2. The device of claim 1 having:
  B. (4) a passage through the boss of the plug and radially out to the edge thereof; and
  A. (3) a registering opening in the wall of the body, to provide a vent for the interior of the valve means.

3. The device of claim 1 including retaining means for the sealing-closure means.

4. The device of claim 1, the sealing-closure means having a portion external to said body, adapted for connection to a supply line.

5. The device of claim 1 wherein the closure is retained in the cup by a spring clip.